No. 733,216. PATENTED JULY 7, 1903.
E. KEMPSHALL.
GOLF BALL.
APPLICATION FILED JUNE 15, 1903.
NO MODEL.
Fig. 1.
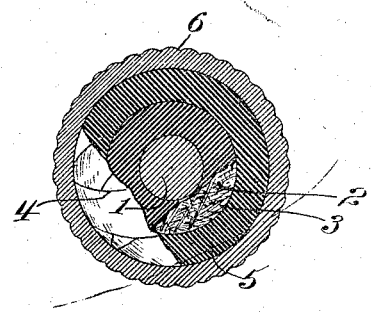
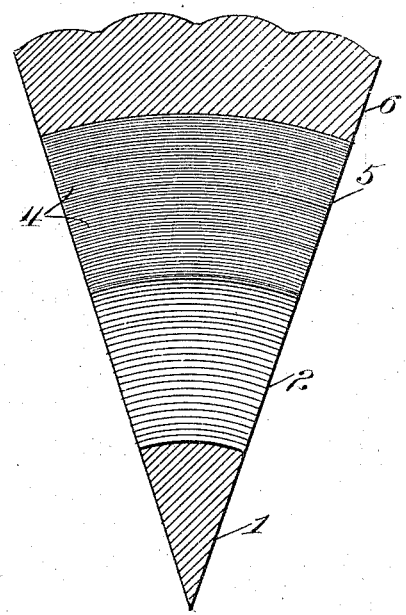
Fig. 2.
Witnesses:
Fred. E. Maynard
B. C. Stickney
Inventor:
Eleazer Kempshall,
By his Attorney
F. H. Richards No. 733,216.

Patented July 7, 1903.

UNITED STATES PATENT OFFICE.

ELEAZER KEMPSHALL, OF BOSTON, MASSACHUSETTS.

GOLF-BALL.

SPECIFICATION forming part of Letters Patent No. 733,216, dated July 7, 1903.

Application filed June 15, 1903. Serial No. 161,559. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Golf-Balls, of which the following is a specification.

This invention relates to golf-balls; and its object is principally to increase the driving power or flying capability of the ball.

A further object is to produce a ball of great driving power whose weight shall conform to standard.

A further object is to provide a ball having a sufficiently elastic interior to give the ball the desired flight without rendering the shell liable to bursting.

In the accompanying drawings, Figure 1 is a sectional view of a ball made in accordance with my present improvements. Fig. 2 is an elevational view, upon an enlarged scale, of a fragment of the ball.

In the views like signs denote like parts.

Upon the center piece 1, preferably of gutta-percha, I wind in miscellaneous directions a thread of fine cured-rubber thread under tension to form a sphere 2, the diameter of which is preferably one inch, although it may be a trifle greater or smaller. The center piece 1 may be omitted and the entire sphere 2 may consist of windings of the thread.

It will be understood that throughout the sphere 2 there occur innumerable interstices, as indicated at 3, and these interstices make it possible for this sphere, considered as a whole, to be compressed slightly in bulk when the ball is given a blow, owing partly to the interstices and partly to the yielding nature of the rubber thread. It is also possible for the sphere to be locally compressed at any point to an appreciable degree.

Upon the sphere 2 I wind in miscellaneous directions very thin sheeting of cured rubber 4 to make a sphere 5, whose diameter is one and one-half inches, more or less, and upon this sphere, which completes the filling, I apply under heat and pressure a gutta-percha shell 6, which normally holds the filling under great compression, the standard diameter of the ball being about from one and three-quarters to one and seven-eighths inches.

The sphere 5 is preferably formed of acid-cured rubber—that is, rubber which has been changed from a crude to a usable state by a well-known acid process and which can be drawn extremely thin and withstands great strain. This layer 5 is solid throughout, the solidity being effected by the thinness to which the sheeting is tensioned, in combination with the hard-packing action due to the tenseness of the windings themselves, which it will be understood packs the layers in a most effectual manner. Owing to the solidity of the layer thus formed, all parts of which are under great tension, (preferably considerably greater than the tension of the rubber thread which forms the sphere 2,) lateral flow of the rubber shell or strip becomes impossible, and hence any further distortion of the rubber when the ball is struck can occur in a direction longitudinally of the highly-tensioned strips. Moreover, this layer 5 is so hard and so highly tensioned as not to be duly affected by a light blow, rendering the ball excellent for putting. This sheeting I wind continuous in miscellaneous directions, layer over layer, in such a manner as to make the ball solid throughout. I prefer to use sheeting originally from nine one-thousandths to twelve one-thousandths of an inch in thickness and tensioned to an extent to reduce such thickness to from three one-thousandths to four one-thousandths of an inch. When the ball is struck, the force is transmitted from the gutta-percha shell through the tense rubber layer 5 to the highly-elastic but compressible inner rubber-thread sphere 2, by the yielding whereof two results are accomplished. The first consists in the reaction of said sphere 2, whereby the flight of the ball is aided, and the second consists in the prevention of the bursting of the gutta-percha shell 6. In reference to bursting it will be understood that because of the solidity of the layer or shell 5 any change in the form thereof produced by a blow increases the superficial area of the sphere 5, or, in other words, tends to stretch and burst open the gutta-percha shell 6. Now by having within said shell 5 a rubber-thread sphere 2 which is full of interstices the latter by reason of its compressibility may yield sufficiently to take up the expansive pressure of the solid layer 5 when it is struck, so that the latter may have opportunity to expand inwardly as well as outwardly, and thereby the outward expansive action is reduced, and hence the life of the shell 6 is materially prolonged. That this is a desideratum will be understood from the fact that some kinds of golf-balls are liable to burst apart at the first blow of the club and seldom withstand more than a few severe blows. Moreover, the rubber-thread sphere 2 when given this extra pressure under a blow immediately recovers its normal shape, and thereby adds materially in the flight of the ball, while by the provision of this bodily-compressible thread-filling for the rubber shell 5 the latter has more room for distortion, and hence more chance to react upon the club while the ball is in contact therewith, thereby further increasing the flying power of the ball.

It is found by testing that the weight of a shell consisting of tensioned rubber threads, as 2, is less than the weight of a similar shell made of pure sheeting, as employed in the layer 5, so that by my construction the weight of the ball is made less than when the filling consists throughout of acid-cured rubber sheeting, so that the sphere 2, which preferably occupies more than half the diameter of the ball, is of less specific gravity than the outer portion of the ball, which is a desideratum, as it produces a tendency to prolong the flight of the ball when it is skilfully struck.

Having thus described my invention, I claim—

1. A golf-ball comprising a sphere of tensioned windings of cured-rubber thread, a substantial sphere thereon consisting of a multitude of windings of extremely thin and highly-tensioned cured sheet-rubber, said sheet-rubber windings forming a solid layer, and a cover of plastic material.

2. A golf-ball comprising a sphere of tensioned windings of cured-rubber thread, a substantial sphere thereon consisting of a multitude of windings of extremely thin and highly-tensioned acid-cured sheet-rubber, said sheet-rubber windings forming a solid layer, and a cover of gutta-percha.

3. A golf-ball comprising a sphere of tensioned windings of cured-rubber thread, a substantial layer thereon consisting of a multitude of windings of extremely thin and highly-tensioned acid-cured sheet-rubber, said sheet-rubber windings forming a solid layer, and a cover of gutta-percha holding said windings under compression.

4. A golf-ball comprising a center piece, a sphere of tensioned windings of cured-rubber thread thereon, a substantial layer thereon consisting of a multitude of windings of extremely thin and highly-tensioned acid-cured sheet-rubber, said sheet-rubber windings forming a solid layer, and a cover of plastic material.

5. A golf-ball comprising a sphere of tensioned windings of cured rubber, a substantial layer thereon consisting of a multitude of windings of extremely thin and highly-tensioned acid-cured sheet-rubber, said sheet-rubber windings forming a solid layer, and a cover of plastic material; said rubber-thread layer being about one inch in diameter, and said solid layer being about one and one-half inches in diameter.

6. A golf-ball comprising a sphere of tensioned windings of rubber thread, a substantial layer thereon consisting of a multitude of windings of extremely thin and highly-tensioned acid-cured sheet-rubber, said sheet-rubber windings forming a solid layer, and a cover of plastic material; the diameter of said rubber-thread sphere being more than one-half the diameter of the ball.

7. A golf-ball comprising a center piece, a sphere of tensioned windings of cured-rubber thread, a substantial layer thereon consisting of a multitude of windings of extremely thin and highly-tensioned cured sheet-rubber, said sheet-rubber windings forming a solid layer, and a cover of plastic material; the rubber in said sheet-rubber layer being under greater tension than the rubber in said thread layer.

Signed at Nos. 9 to 15 Murray street, New York, N. Y., this 13th day of June, 1903.

ELEAZER KEMPSHALL.

Witnesses:
B. C. STICKNEY,
RALPH JULIAN SACHERS.